(12) United States Patent
Kim et al.

(10) Patent No.: US 8,429,967 B2
(45) Date of Patent: Apr. 30, 2013

(54) WATER LEVEL DISPLAY DEVICE USING LED, AND WATER LEVEL MEASUREMENT SYSTEM INCLUDING THE SAME

(75) Inventors: Won Kim, Seoul (KR); Dong Gu Kim, Seoul (KR); Chan Joo Lee, Incheon (KR)

(73) Assignee: Korea Institute of Construction Technology, Goyang-si (KR)

( * ) Notice: Subject to any disclaimer, the term of this patent is extended or adjusted under 35 U.S.C. 154(b) by 322 days.

(21) Appl. No.: 12/988,793

(22) PCT Filed: Dec. 9, 2009

(86) PCT No.: PCT/KR2009/007360
§ 371 (c)(1),
(2), (4) Date: Oct. 20, 2010

(87) PCT Pub. No.: WO2010/068036
PCT Pub. Date: Jun. 17, 2010

(65) Prior Publication Data
US 2011/0030470 A1 Feb. 10, 2011

(30) Foreign Application Priority Data
Dec. 10, 2008 (KR) .................... 10-2008-0125328

(51) Int. Cl.
*G01F 23/24* (2006.01)

(52) U.S. Cl.
USPC .................... 73/304 R; 73/293; 73/866.3

(58) Field of Classification Search ........... 73/293, 73/304 R
See application file for complete search history.

(56) References Cited

U.S. PATENT DOCUMENTS

| 2,570,451 | A | * | 10/1951 | Hottenroth | 236/44 A |
| 4,383,444 | A | * | 5/1983 | Beaman et al. | 73/304 C |
| 5,503,533 | A | * | 4/1996 | Potter et al. | 417/63 |
| 7,584,656 | B2 | * | 9/2009 | Senghaas et al. | 73/170.21 |

FOREIGN PATENT DOCUMENTS

| JP | 1998-020938 A | 1/1998 |
| KR | 1991-0002960 | 5/1991 |
| KR | 0128493 | 12/1998 |
| KR | 20-0394329 | 9/2005 |

OTHER PUBLICATIONS

PCT International Search Report, PCT/KR2009/007360, dated Jul. 20, 2010, 2 pp.
Office Action, KR 10-2008-125328, dated Aug. 16, 2010, 5 pp.

* cited by examiner

*Primary Examiner* — Hezron E Williams
*Assistant Examiner* — Paul West
(74) *Attorney, Agent, or Firm* — Fenwick & West LLP

(57) ABSTRACT

The present invention includes: plural common terminals; plural water level measurement terminals that are arranged at a certain interval along a longitudinal direction; a water level measurement control unit that measures the water level of a measurement subject by letting an electric current flow to the plural common terminals, then reading the state information of an electric current flowing to the plural water level measurement terminals; and an LED unit that reads and displays the water level measurement results through plural LEDs. The water level measurement system according to the invention comprises: the above-mentioned water level display device; a main control module that controls the water level display device to read the water level measurement results from the water level display device and display the water level measurement results in numerical form or on a scale; a power supply module that supplies power to the water level display device under the control of the main control module; and a display module that displays the water level measurement results according to control of the main control module.

3 Claims, 6 Drawing Sheets

WATER LEVEL DISPLAY DEVICE USING LED, AND WATER LEVEL MEASUREMENT SYSTEM INCLUDING THE SAME

TECHNICAL FIELD

The present invention relates to an apparatus for displaying a water level using a light emitting diode and a system for measuring a water level using the same, and more specifically to an apparatus for displaying a water level and a system for measuring a water level using the same with increased visibility.

BACKGROUND ART

Generally, a water level measuring system has been used for measuring the water levels of rivers, lakes or streams. Information obtained by measuring of the water level measuring system, such as the current water levels, the change of the water levels, are used for many purposes such as bridge management, prediction of flood during a rainy season, or traffic control for security in case of a water level equal to or above a predetermined level. Water level meters used for a water level measuring system are classified into a contact type water level meter that measures a water level by contacting water, and a non-contact type water level meter that measures a water level by projecting ultrasound or laser beams to water.

Such a water level measuring system is usually installed at a bridge pier in a stream or a lake. Considering that the water level measuring system is used to predict flood or control traffic safely, when the water level of a river or a stream reaches or exceeds a predetermined level or there is a rapid change in the water level, these events should be notified to persons walking along a bridge or a manager as soon as possible.

However, it is very difficult to monitor a conventional water level measuring system at night, during raining, or in case of a rapid change in water level with the naked eye. Even if the water level can be observed, there is a high probability of error in the observed water level due to lack of visibility. Especially at the flood site, fluctuating water levels should be monitored with the naked eye. Therefore, the conventional water level measuring system is almost useless.

DISCLOSURE

Technical Problem

Therefore, the present invention has been made in view of the above problems. It is an object of the present invention to provide an apparatus for displaying a water level using a light emitting diode, which increases the visibility of a displayed average water level even at night or during raining and enables utilization of water level measurements for real-time measuring and analysis through an automatic water level recognition function, and a system and a method for measuring a water level.

Technical Solution

In accordance with an aspect of exemplary embodiments of the present invention, a water level display apparatus includes a plurality of common terminals, a plurality of water level measurement terminals arranged vertically, apart from one another, a water level measurement controller for measuring a water level of a measurement target by conducting current through the plurality of common terminals and reading current through the plurality of water level measurement terminals, and an LED (Light Emitting Diode) unit for reading the water level measurement from the water level measurement controller and displaying the water level measurement through a plurality of LEDs.

In accordance with an aspect of exemplary embodiments of the present invention, a water level display system includes a water level display apparatus for conducting current in a measurement target through a plurality of common terminals, measuring a water level by reading current flowing through a plurality of water level measurement terminals arranged vertically, apart from one another, and displaying the water level measurement by controlling on/off of a plurality of LEDs; a main control module for reading the water level measurement from the water level display apparatus and controlling the water level display apparatus to display the water level measurement through the plurality of LEDs; a power supply module for supplying power to the water level display apparatus under control of the main control module; and a display module for displaying the water level measurement under the control of the main control module.

Advantageous Effects of Invention

The water level display apparatus and the water level measuring system of the present invention can display an average water level accurately by ensuring visibility at night or during raining and provide an automatic water level recognition function. Therefore, water level measurements can be used for real-time measuring and analysis.

BEST MODE FOR PRACTICING INVENTION

A water level display apparatus and a water level measuring system using the same according to a preferred embodiment is described herein in detail with reference to FIGS. 1 through 6.

Figure 1:
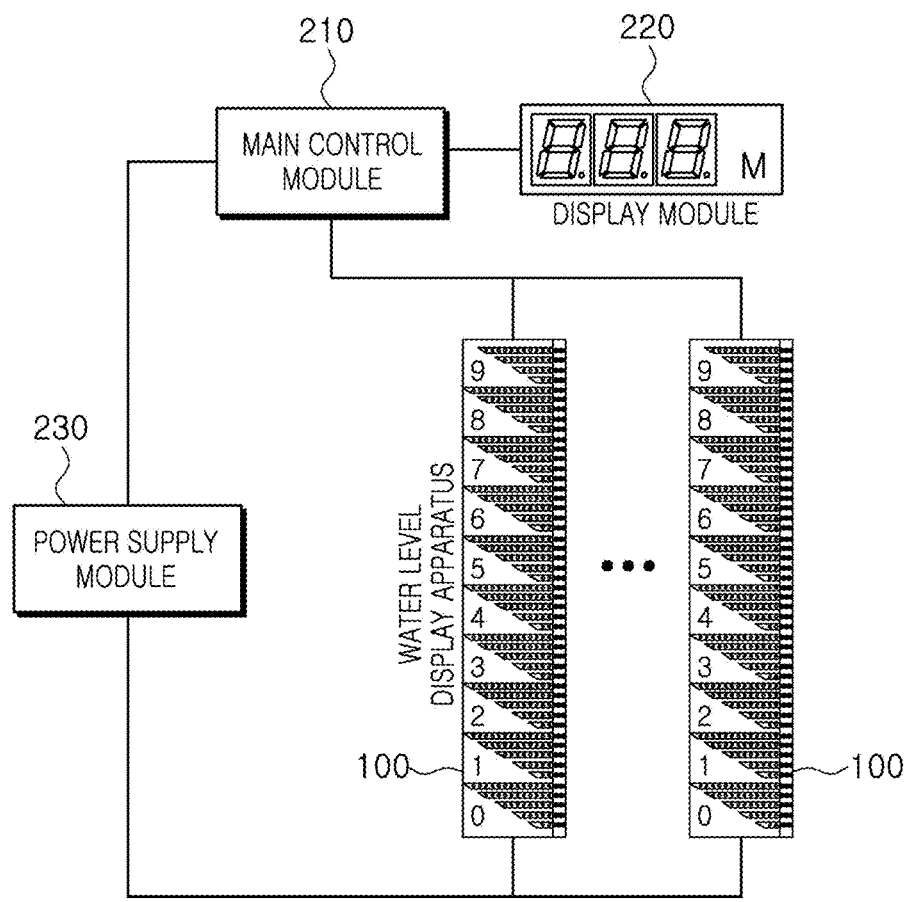
FIG. 1 is a diagram illustrating the overall configuration of a water level measuring system according to an embodiment of the present invention.

FIG. 1 is a diagram illustrating the overall configuration of a water level measuring system according to an embodiment of the present invention.

Referring to figures, a water level measuring system according to an embodiment of the present invention includes a water level display apparatus 100, a main control module 210, a display module 220, and a power supply module 230.

The water level display apparatus 100 is installed in a river or stream, for measuring the current water level and for transmitting the measuring results of the water level information to the main control module 210. In each water level display apparatus 100, a level marking part and a numeral part are configured to be LEDs (Light Emitting Diodes) that can be turned on or off. The LEDs are lighted according to a water level to increase visibility. Hence, a manager or passersby can readily identify the water level with naked eye even in environment with low visibility such as at night or during raining.

Water level display apparatus 100 of the present invention allows current to flow through a measurement target through an output terminal (a common terminal). When a water level measurement terminal (input terminal) is immersed in the measurement target (e.g., water), low current in the input terminal is amplified. After measuring the level of the measurement target by reading the amplified current value, the water level display apparatus 100 displays the water level measurement by turning on or off a plurality of LEDs arranged to form a display such as a numeral part and a level marking part.

The main control module 210 reads water level measurements from the water level measuring apparatuses 100, analyzes the read water level measurements comprehensively, and transmits water level information based on the analysis to each water level display apparatus 100 so that the water level display apparatus can display the water level measurement using numerals and markings in the form of the plurality of LEDs.

The power supply module 230 supplies power to each water level display apparatus 100 under the control of the main control module 210. Since the water level display apparatus 100 is based on operation of the LEDs, the water level display apparatus 100 does not consume much power and thus can be operated using a solar cell.

The display module 220 may be an electronic display board that displays a water measurement under the control of the main control module 210. During flood or during monitoring a water level, a manager or a passerby may readily identify the current water level from the display module 220.

When the power supply module 230 supplies DC power to the water level display apparatus 100, the main control module 210 collects current water level information from a plurality of water level display apparatuses 100 (e.g. 32 water level display apparatuses) installed at multiple places, analyses the current water level information, displays a current water level on the display module 220, and provides the water level information to another system via an internal communication line (e.g. an RS232 communication line).

Figure 2:
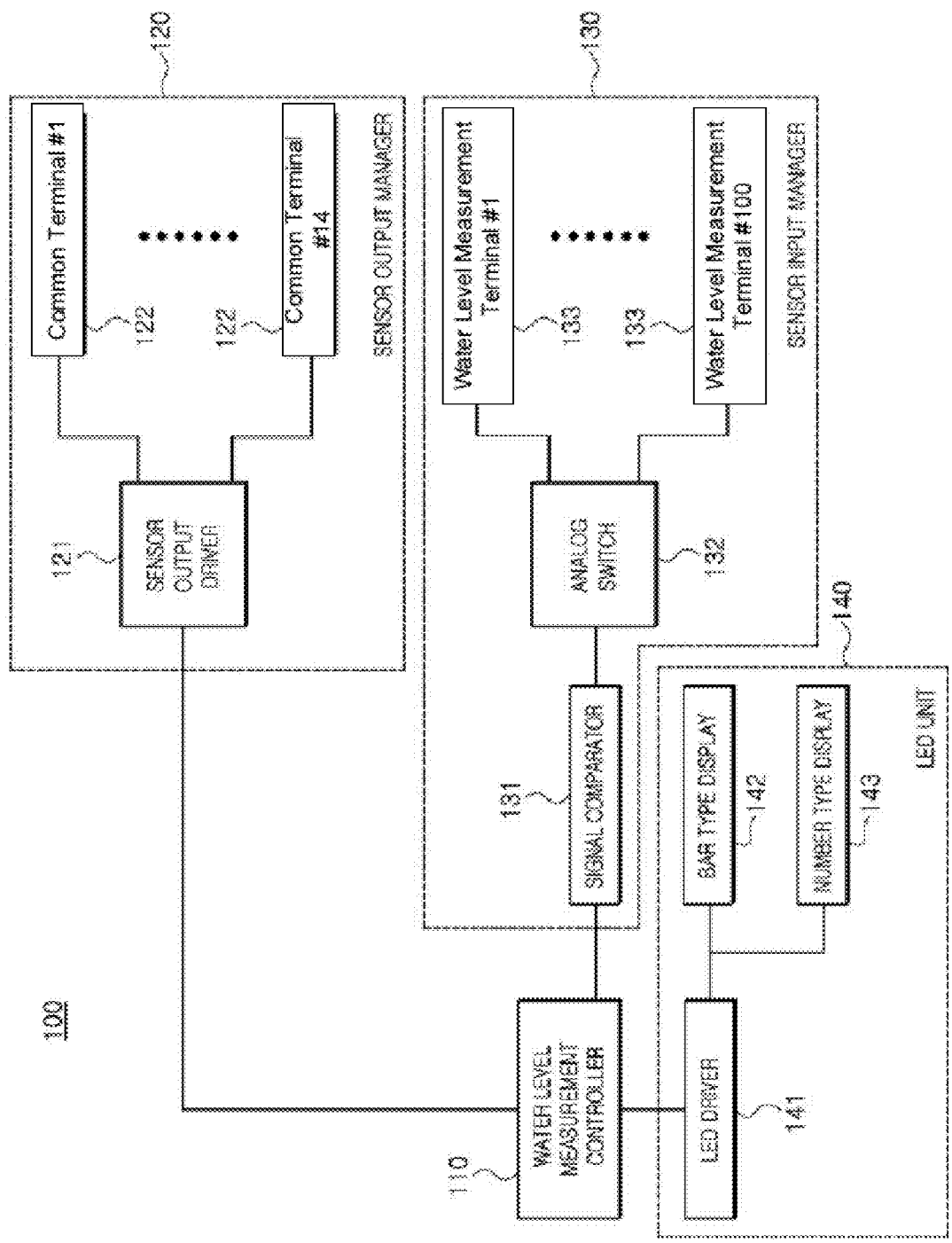
FIGS. 2 and 3 are detailed views of a water level display apparatus of FIG. 1.
Figure 3:
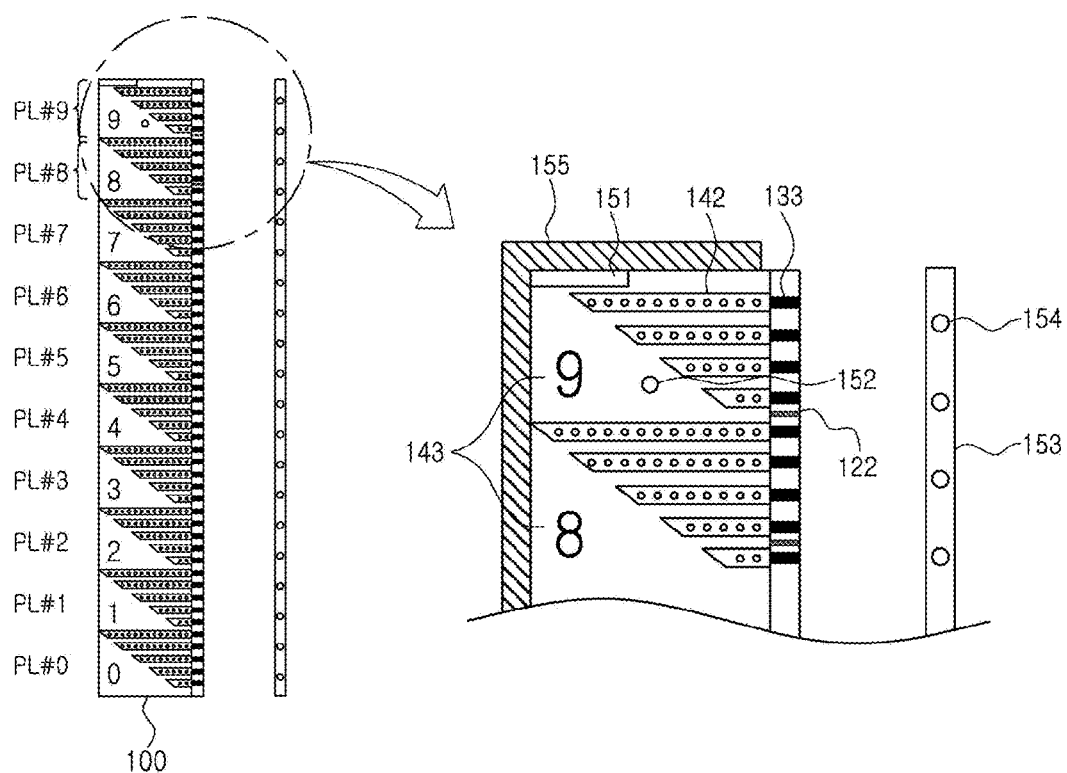

FIGS. 2 and 3 are detailed views of a water level display apparatus illustrated in FIG. 1.

In an embodiment of the present invention illustrated in FIG. 2, the water level display apparatus 100 includes a water level measurement controller 110, a sensor output manager 120, a sensor input manager 130, and an LED unit 140.

The sensor output manager 120 includes a plurality of common terminals 122 and a sensor output driver 121. The sensor input manager 130 includes a plurality of water level measurement terminals 133, an analog switch 132, and a signal comparator 131.

Since the water level measurement controller 110 is provided within the water level display apparatus 100, the water level measurement controller 110 may perform the functions of accurate water level identification, average water level calculation, and water level display. The water level measurement controller 110 may also perform customized programming according to the manager's request.

The water level measurement controller 110 generates a water level measurement by allowing current to conduct through the plurality of common terminals 122 and reading the current state of each water level measurement terminal.

Specifically, when a low-frequency AC signal is applied to the externally exposed output terminals (the common terminals 122), the sensor output driver 121 creates an amplified AC signal. The water level measurement terminals 133 are input terminals. A plurality of externally exposed water level measurement terminals 133 (e.g., 100 water level measurement terminals) are spaced apart by a predetermined distance (e.g., 10 cm). When the common terminals 122 and the water level measurement terminals 123 are simultaneously immersed in a measurement target, signals of the common terminals 122 are transmitted to the water level measurement terminals 133 through impurities in the measurement target. As a result, low current flows through the water level measurement terminals 133. The AC signals applied to the water level measurement terminals 133 are transmitted to the water level measurement controller 110 through the signal comparator 131. The water level measurement controller 110 can identify the water level using the AC signals.

A plurality of common terminals 122 (e.g., 16 common terminals) are arranged with an equal distance. AC signals having the electrically same phase are received at the common terminals 122. The sensor output manager 120 applies low-frequency AC signals having the same phase to the plurality of common terminals 122.

As illustrated in FIG. 3, the plurality of water level measurement terminals 133 are arranged at predetermined intervals vertically to form markings. The markings for reading the water level are determined according to the spacing between the water level measurement terminals 133. For example, if the water level measurement terminals 133 are arranged every 10 cm, a water level may be read with an increment of 10 cm.

An analog switch 132 is an electrical switch for connecting a plurality of water level measurement terminals 133 (e.g. 100 water level measurement terminals) to the water level measurement controller 110. The analog switch 132 sequentially selects the plurality of water level measurement terminals 133 and connects signals received from the selected water level measurement terminals 133 to the water level measurement controller 110. When the analog switch 132 sequentially selects the plurality of water level measurement terminals 133 and transmits current flowing through each water level measurement terminal 133 to the signal comparator 131, the signal comparator 131 amplifies the current and outputs the amplified current to the water level measurement controller 110.

Subsequently, the water level measurement controller 110 determines whether each water level measurement terminal 133 is immersed in the measurement target based on the current value of each water level measurement terminal 133 and determines a water level according to the determination.

The LED unit 140 displays a water level measurement by turning on or off a plurality of LEDs arranged to form numerals and markings according to the water level measurement read from the water level measurement controller 110. In the embodiment illustrated in FIG. 2, the LED unit 140 includes a bar type display 142, a number type display 143, and an LED driver 141. However, many other shapes may be used in the LED unit 140.

In this way, the water level display apparatus 100 allows current to flow through a measurement target via the common terminals 122, amplifies slight current flowing when the water level measurement terminals 133 are immersed in the measurement target, and reads a water level through the water level measurement controller 110. Then the water level measurement is transmitted to the main control module 210. The LED unit 140 is controlled to display the water level result upon receiving the request from the main control module 210.

Referring to FIG. 3, the water level display apparatus 100 may be formed by connecting a plurality of basic plates (PLs) PL#0 to PL#9 of a predetermined length (e.g., 1 m) to obtain the water level display apparatus 100 of a desired length. Each basic PL includes the bar type display 142 and the number type display 143 that are formed with a plurality of LEDs in order to display a water level measurement in the form of a number or marking.

Assuming that the length of the basic PL is 1 meter and the basic PL has a marking every 1 cm, the water level measurement terminals 133 are arranged every 1 cm along the 1 meter length. As the analog switch 132 sequentially selects the water level measurement terminals 133 and connects the selected water level measurement terminals to the water level measurement controller 110, the water level may be sensed with a resolution of 1 cm. The water level measurement controller 110 reads the state of the analog switch 132, transmits information about the state to the main control module 210, and turns on LEDs at positions corresponding to a water level measurement received from the main control module 210. In addition, the water level measurement 110 may function to turn on or off a anti-freeze heat line upon receiving a command from the main control module 210.

In the bar type display 142, markings are formed at every predetermined interval on the same lines with the plurality of water level measurement terminals 133 and a plurality of LEDs are arranged horizontally per marking. This bar type display 142 displays a water level measurement as a number by turning on or off of the horizontal LEDs. The number type display 143 have a plurality of LEDs arranged to display a number. A water level measurement is displayed as a number under the control of the LED driver 141.

The LED driver 141 controls the bar type display 142 and the number type display 143 to display a water level measurement as a marking and a number.

The water level display apparatus 100 may further include an inlet unit 153 and a freeze prevention unit 155. The inlet unit 153 is provided with a plurality of paths through which a target fluid flows, arranged at every predetermined interval vertically. The freeze prevention unit 155 includes a freeze-preventing heat line to allows use of the water level display apparatus 100 even in winter or in a low-temperature region.

Because the LEDs do not consume much power during operation, it is possible to operate the water level display apparatus 100 by electricity generated by solar cells used as the power supply module 230. That is, when it is difficult to connect to a power grid or the cost of electricity high, a battery chargeable with solar power may be used. However, when the freeze prevention unit 155 having a heat line is provided in the water level display apparatus 100 to prevent freezing in the vicinity of the water level display apparatus 100, an additional power supply may be needed. Also, the water level display apparatus 100 having an electrical circuit for driving the LEDs should be water-proof because it may be immersed for an extended time in a target fluid.

The basic PLs of the water level display apparatus 100 is described herein in greater detail with reference to the embodiment illustrated in FIG. 3.

A connection member 151 provides space needed for wiring when the basic PLs are connected to one another. The common terminals 122 are conductors for measuring a water level, which are formed on the copper surface of a PCB and plated with gold to prevent rust and increase conductivity. The common terminals 122 are current sources arranged at appropriate intervals from the bottom.

The bar type display 142 is a horizontal array of LEDs for displaying a water level. A bar type display 142 is formed per marking (e.g., 1 cm).

The water level measurement terminals 133 are arranged, one per marking. The water level measurement terminals 133 are conductors for measuring a water level, which area formed on the copper surface of the PCB and plated with gold to prevent corrosion and increase conductivity.

The inlet unit 153 includes a plurality of paths 154 for allowing a target fluid to flow therethrough. The inlet unit 153 is positioned near the common terminals and the water level measurement terminals 133. Holes 152 are formed in each basic PL such that the basic PL may be attached to a structure such as a bridge pier using screws.

The water level display apparatus 100 measures a current water level by conducting current through the common terminals of the above-described basic PLs and reading the water level measurement terminals 133 arranged one for each marking. Then the water level measurement controller 110 transmits the current water level measurement to the main control module 210 and turns on or off the LEDs upon receiving the command of the main control module 210.

Figure 4:
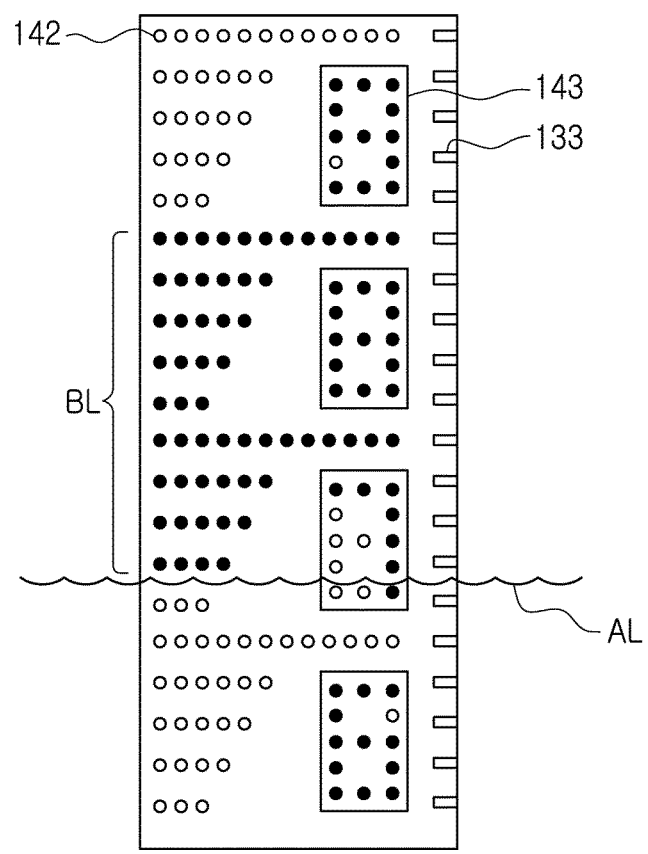
FIGS. 4 and 5 are schematic views of the water level display apparatus for illustrating the operation of the water level display apparatus of FIG. 1.
Figure 5:
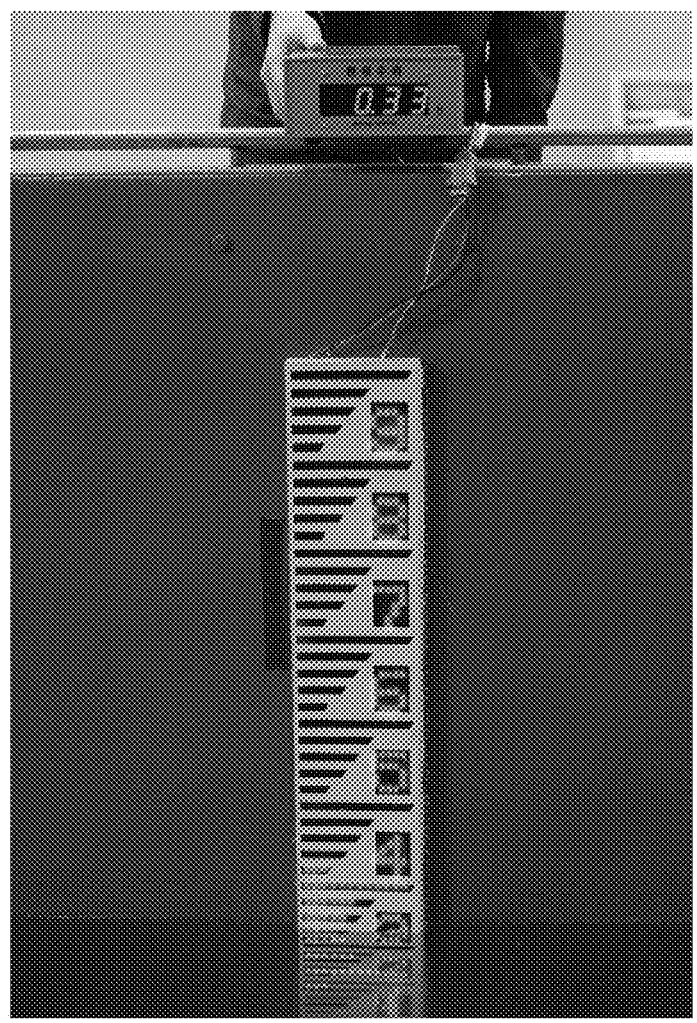

FIGS. 4 and 5 are views of the water level display apparatus illustrated in FIG. 1 for describing an operation of the water level display apparatus. FIG. 4 is a schematic view of the water level display apparatus 100. FIG. 5 is a photo of the water level display apparatus 100.

The main control module 210 of the water level measuring system comprehensively analyzes water level information collected from one or more water level display apparatuses 100, turns on a bar type display 142 and a number type display 143 corresponding to a current water level in each water level display apparatus 100. Water level information is displayed through the display module 220 or transmitted to a requesting device.

The water level measurement controller 110 of each water level display apparatus 100 retains water level information detected by the signal comparator 131 and transmits the water level information to the main control module 210 upon receiving the request of the main control module 210. Further, the water level measurement controller 110 illuminates LEDs upon request of the main control module 210 to indicate the water level, as illustrated in FIGS. 4 and 5.

The water level display apparatus 100 can automatically identify the water level using electrical conductors that form the common terminals 122 and the water level measurement terminals 133, and increase visibility using LEDs at the number part and the level marking part. Thus, a water level value may be visible to the naked eye.

If the water level display apparatus 100 is designed such that numbers of all PLs are always illuminated and only the top marking of a current water level is illuminated, during driving LEDs, LEDs of all number type displays 143 at positions BL above water level AL are illuminated with the LEDs of all number type displays 143 illuminated, as illustrated in FIGS. 4 and 5.

The water level measuring system automatically measures the current water level or a water level during a predetermined period through one or more water level display apparatuses 100 installed at bridge piers or structures in a river or a stream, indicates the water level through the LED unit 140 of each water level display apparatus 100 so that a manager or a passer can easily identify the water level, and transmits the water level measurement to a central control center or another requesting device. Thus, the system can display the received water level measurement on the display module 220 or collect it as data. In this manner, the water level measurement can be used for many purposes.

Figure 6:
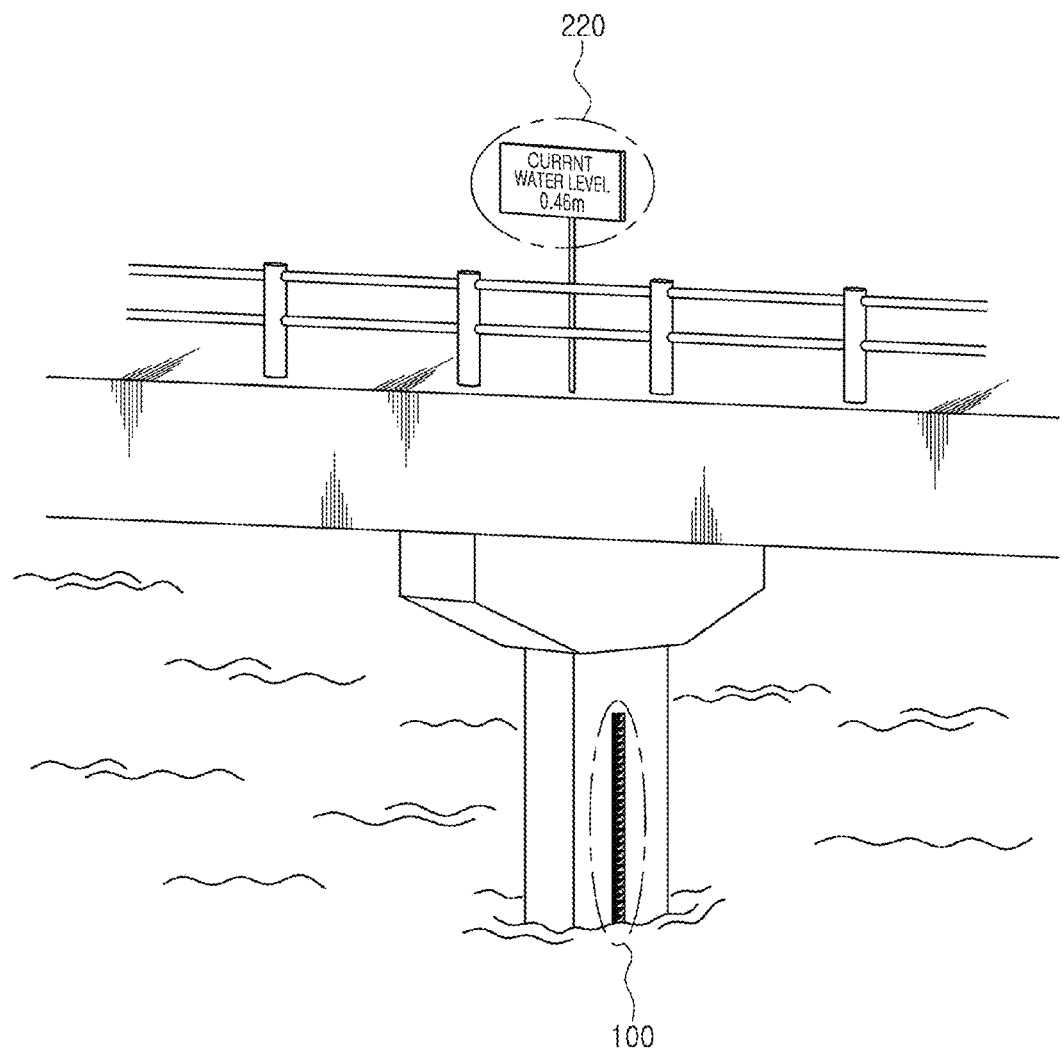
FIG. 6 is a diagram illustrating a water level display apparatus of FIG. 1 installed on a bridge pier.

FIG. 6 illustrates a water level display apparatus of FIG. 1 installed on a bridge pier.

The display module 220 on a bridge has the main control module 210 and the power supply module 230 for power supply. If a plurality of (e.g., 5) water level display apparatuses 100 are installed on bridge piers at predetermined locations of the bridge and water level measurements are provided from the water level display apparatuses 100 to the main control module 210, the main control module 210 comprehensively analyzes the water level measurements in real time so as to utilize them for many purposed such as protection from severe rain storm or flood and traffic control.

To improve the performance of the water level display apparatus 100, some considerations may be additionally taken into account.

For example, the whole water level display apparatus 100 except for electrical conductors should be waterproof to protect the circuitry immersed in a measurement target fluid for an extended amount of time. In addition, the water level display apparatus 100 should be robust against impact by ensuring durability in order to prevent damage to the internal circuitry. Since low-power LEDs are used for the water level display apparatus 100, the water level display apparatus 100 can be designed in a low-power structure. The freezing prevention unit 155 for preventing freezing by generating heat electrically is attached to a basic PL so as to allow a water level to be measured even on a freezing day.

The following Table 1 illustrates exemplary criteria to evaluate the performance of the water level display apparatus 100.

Therefore, the preferred embodiments of the invention have been provided for those skilled in the art in order to advise the features and the spirit of the invention, and the invention cannot be limited to the preferred embodiments, and the invention could be defined only by the claims.

INDUSTRIAL APPLICABILITY

This invention is useful for noise absorbing.

The invention claimed is:

1. A fluid level measuring system comprising:
a fluid level display apparatus comprising:
at least one first terminal,
a plurality of second terminals placed at different vertical locations of the member, the at least one first terminal causing current in second terminals immersed in a fluid,
a fluid level measurement controller connected to the plurality of second terminals for detecting current in the plurality of second terminals to measure a level of fluid,
a display unit connected to the fluid level measurement controller for turning on a combination of a plurality of lighting elements representing the fluid level, and
a plurality of plates connected to one another, each plate having a predetermined length and including:
a plurality sets of first lighting elements, each set of first lighting elements spaced at vertical locations corresponding to one of the plurality of second terminals and turned on or off to display the fluid level measurement, and
a set of second lighting elements, a combination of the second lighting elements turned on or off to display an alphanumeric character representing the fluid level measurement; and
a control module for receiving the fluid level measurement from the fluid level display apparatus;

TABLE 1

| Functions | Evaluation criteria | Results |
| --- | --- | --- |
| Illumination of LEDs | Visibility based on illumination of LEDs in day/at night | Day/night visibility: 20 meters |
| Automatic water level identification | Level identification in case of water level change | A resolution of 1 cm. When a water level changes rapidly, the average of water level measurements for previous 10 minutes can be displayed. Various programming is possible using a microprocessor. |
| Water-proof | Perfect water-proofing for circuit protection | Primary waterproofing of a PCB by silicon and secondary waterproofing of the PCB by external molding. |
| Durability | Durability against objects falling into water, durability against temperature change | The entire surface of the water level display apparatus is formed of a PC (Poly Carbonate) robust against impact, heat and freezing. |
| Low-power structure | Maximum power usage (in the absence of freezing preventing unit) | Power consumption 10 W (per basic PL) |

While certain preferred embodiments of the invention have been shown and described with reference to the drawings, it will be understood by those skilled in the art that various changes in form and details may be made therein without departing from the spirit and the main features of the invention.

a power supply module for supplying power to the fluid level display apparatus; and a display module separate from the fluid level display apparatus and connected to the control module, the display module displaying the fluid level measurement.

2. The fluid level measuring system of claim 1, wherein the fluid level display apparatus further comprises a freezing prevention unit including a freeze-preventing heat line.

3. The fluid level measuring system of claim 1, wherein the control module receives fluid level measurements from a plurality of fluid level display apparatuses, analyzes the received water level measurements, and controls each of the water level display apparatus to turn on or off lighting elements based on the analysis.

* * * * *